B. McCULLUM.
ALTERNATING CURRENT INDUCTION MOTOR.
APPLICATION FILED AUG. 2, 1915.
1,226,091.
Patented May 15, 1917.
2 SHEETS—SHEET 1.
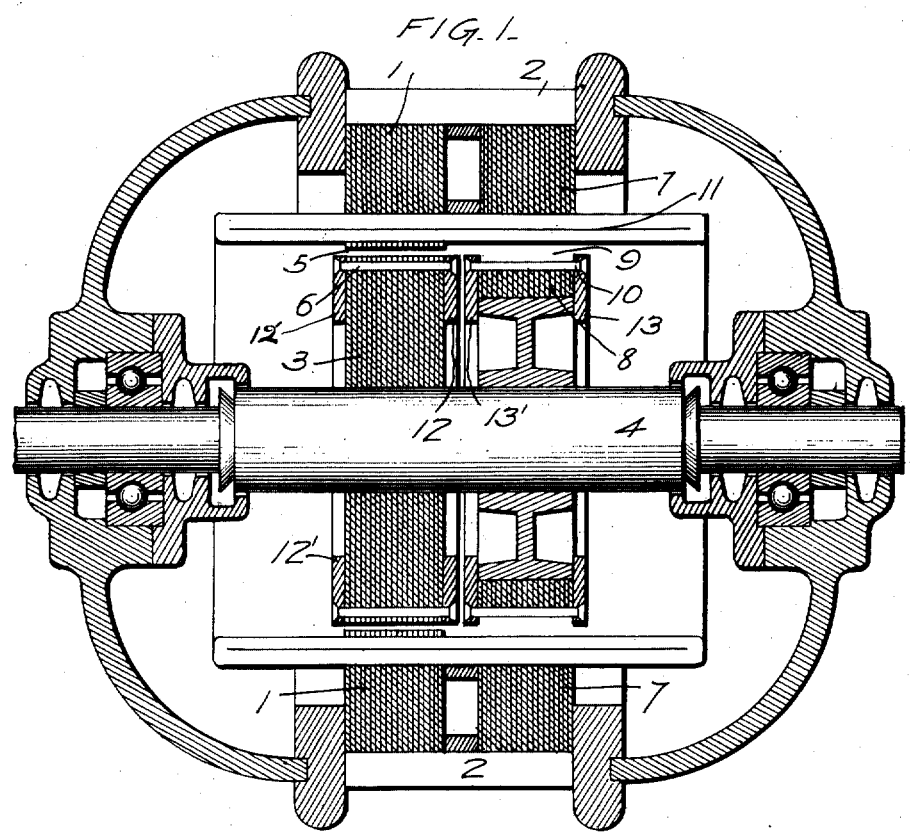
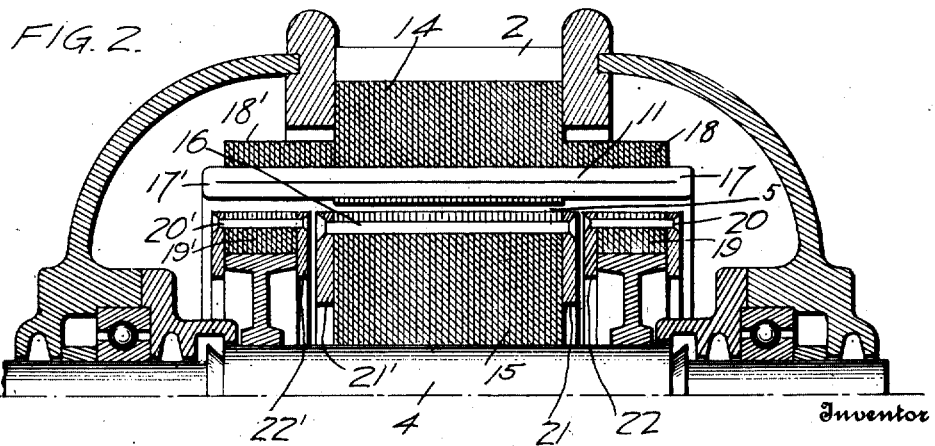
Witness
Inventor
Burton McCollum B. McCOLLUM.
ALTERNATING CURRENT INDUCTION MOTOR.
APPLICATION FILED AUG. 2, 1915.
1,226,091.
Patented May 15, 1917.
2 SHEETS—SHEET 2.
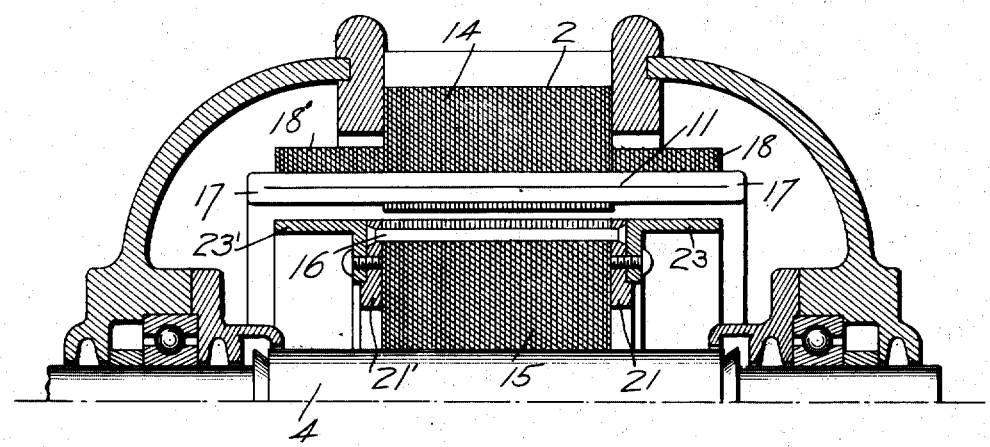
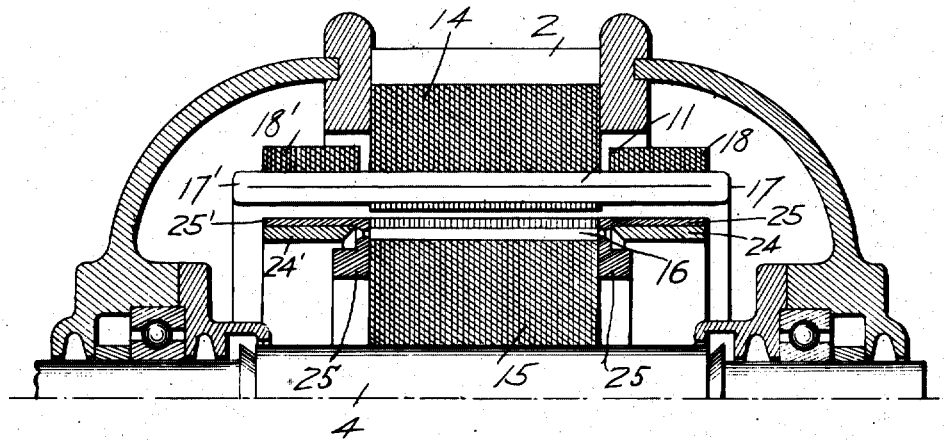
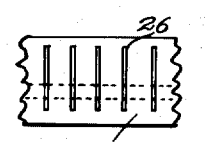
Inventor
Burton McCollum
Witness

UNITED STATES PATENT OFFICE.

BURTON McCOLLUM, OF WASHINGTON, DISTRICT OF COLUMBIA.

ALTERNATING-CURRENT INDUCTION-MOTOR.

1,226,091.　　　　Specification of Letters Patent.　　Patented May 15, 1917.

Application filed August 2, 1915. Serial No. 43,151.

*To all whom it may concern:*

Be it known that I, BURTON McCOLLUM, a citizen of the United States, and a resident of Washington, District of Columbia, have invented certain new and useful Improvements in Alternating-Current Induction-Motors, of which the following is a specification.

The object of my invention is to produce an induction motor which will yield a high starting torque with a relatively low starting current, and which also will operate under load conditions with good efficiency and small speed regulation.

The principle of my invention consists broadly in providing a motor having two or more magnetic circuits in parallel linking with the primary winding, one of the magnetic circuits possessing a low magnetic reluctance, and the other a relatively high reluctance. My invention consists further in providing a number of secondary electrical circuits equal to the number of magnetic circuits, so disposed that one, and one only, of said secondary electrical circuits will link with each magnetic circuit. In carrying out my invention it is desirable to provide further that the magnetic circuits of low reluctance shall link with a secondary electrical circuit of low resistance, and that the magnetic circuits of high reluctance shall link with secondary electrical circuits of relatively high resistance. It will be shown in a later part of this specification that a motor so organized will, in general, partake at starting of the properties of an induction motor having a high secondary electrical resistance, while under running conditions it will possess characteristics peculiar to a motor having a low secondary resistance. It is well recognized that such properties will accomplish the purpose set forth above as the object of my invention. All essential details of my invention are fully described below, reference being made to the accompanying drawings.

Of the drawings:

Figure 1 is a sectional view of rotor and stator of a motor illustrating the fundamental principle of my invention.

Fig. 2 is a sectional view of a portion of a motor showing one practical embodiment of my invention.

Figs. 3 and 4 show modified forms of my invention.

Fig. 5 shows a detail applicable to Fig. 4.

Referring to Fig. 1, 1 is a group of laminations mounted within the stator frame 2. 3 is a group of laminations mounted on the rotor 4, and placed within the group 1, and separated therefrom by a very short air gap 5. These two groups of laminations together with the short air gap 5 constitute the magnetic circuit of low reluctance referred to above. Near the periphery of the laminations 3 there is placed in the usual way a secondary electrical circuit of very low resistance, preferably of the squirrel cage type as shown at 6. Within the same stator frame 2 is placed a second group of laminations 7 beside the group 1, and within these and mounted on the shaft 4 is the group of laminations 8, the groups 7 and 8 being separated by the air gap 9 which is made relatively great compared with the air gap 5. The groups of laminations 7 and 8 together with the air gap 9 constitute the magnetic circuit of high reluctance referred to above. Near the periphery of the laminations 8 is placed a secondary electrical winding 10, preferably having a relatively high resistance compared to the winding 6. This winding is here shown as a squirrel cage winding. 12 and 12′ are the short circuiting rings of the squirrel cage 6, and 13 and 13′ of the squirrel cage 10. A primary electrical circuit 11 which may be of any type, is linked with both magnetic circuits, the two latter being in parallel as shown.

Considering now the operation of the motor under load conditions and at near full speed, it will be seen that by far the greater part of the magnetism required to give the necessary counter electromotive force in the primary winding will be carried by the laminations 1 and 3 for the reason that the air gap 9 is so long that the full load currents in the primary winding can produce relatively little magnetism therein, while the air gap 5 is made so short that even the resultant of the primary and secondary magnetizing forces can produce the necessary magnetism required for the operation of the motor. It will be apparent therefore that the motor will operate under the load conditions substantially as if the magnetic circuit 7, 8, did not exist, and the motor will possess the characteristics afforded by a low resistance secondary circuit.

If now the speed of the motor be reduced to very low values as during the starting period, the relatively heavy currents in the primary winding become large enough to produce a strong magnetic field across the air gap 9. Further, the very low resistance secondary linking with the magnetic circuit 1, 3, will permit a very heavy current to flow even under a very small inducing flux, and this current will exert a counter magnetizing force which will keep the flux in this magnetic circuit at a small value during the starting period. The result will be that during starting and at low speeds most of the flux will link with the high resistance secondary winding, and the starting characteristics of the motor will correspond closely to those of a motor having a large air gap and a high secondary resistance which conditions, as is well known, tend to give the motor a high starting torque and low starting current.

In general, in carrying out my invention, I prefer that the magnetic core 8 be of the smooth core type, the secondary winding or squirrel cage 10 being placed on the surface of the laminations. Similarly, for the primary core 7 it is desirable that the teeth be relatively short, or they may be omitted altogether. This is desirable in order that the air gap 9 may have sufficient magnetic reluctance to cause the motor to operate properly in accordance with the principles outlined above.

It is important that the construction be such as to keep the reactance of the electrical circuits as low as possible, and to assist in attaining this end, the short circuiting rings 12 and 13 should be of large radial depth and at the same time the radial depth of the laminations in the cores 8 should be as small as possible. This will introduce a very large reluctance into the magnetic circuit linking with the rings 12 and 13, thus greatly reducing the reactance and improving the operation of the motor.

It was stated above that while the primary electrical circuit should be made to link with all of the magnetic circuits, the secondary electrical circuits should each link with one, and one only, of the magnetic circuits. This is of great importance for several reasons. In the first place, if both the squirrel cages 6 and 10 are interlinked inductively by placing them both on a common magnetic core, the bars of each of the squirrel cages would have to be placed so far apart that the magnetic leakage of both squirrel cages would be large which would be objectionable for reasons well known. In the second place, if the squirrel cage 10 were made to link also with the core 3 it would still further have its leakage increased by virtue of its linking with two practically iron clad circuits instead of one as here shown, and the starting characteristics of the motor would be thereby impaired. Still another objection to having the high resistance squirrel cage link with the core 3 is that it would take up valuable space and make it impracticable to give the squirrel cage 6 as low a resistance as would generally be desired. It will be seen therefore that it is of great importance that each of the secondary electrical windings be linked with a separate and distinct magnetic circuit.

While the foregoing description sets forth the fundamental principle of my invention and the construction shown in Fig. 1 may be used in practice, I prefer in general a modified form, which, however, operates on exactly the same principle. This modified form is shown in Fig. 2. In this construction there is a main magnetic core 14 mounted in the frame 2, and within the core 14 is a rotor core 15 of the usual type on which is placed a low resistance winding 16 preferably of the squirrel cage type. Both the secondary winding 16 and the primary winding 11 should be embedded in slots in the cores 15 and 14 respectively. These portions of the motor, therefore, do not differ materially from the usual type. My invention consists in part in making use of two additional magnetic circuits in combination with suitable secondary electrical circuits described below. The two additional magnetic circuits may be derived by placing over the end connections 17 and 17' of the primary winding 11, rings of magnetic material 18 and 18' laminated or otherwise adapted to exclude eddy currents, and within these and mounted on the rotor shaft are corresponding magnetic cores 19 and 19' on each of which is mounted a high resistance secondary winding 20 and 21 respectively preferably either of the squirrel cage type or of a still simpler type described below.

The operation of a motor constructed in this way is essentially similar to that described above in reference to Fig. 1. Under ordinary load conditions when running near full speed, practically all of the flux of the motor will be carried by the main magnetic circuit formed through the magnetic cores 14 and 15 and the air gap 5, the reluctance of the magnetic circuits surrounding the end connections being too high to permit any considerable amount of magnetism due to the load currents. However, with decreasing speed and increasing currents, the reaction of the currents induced in the low resistance squirrel cage 16 greatly reduces the magnetism in the main magnetic core and causing an increasing amount of flux to link with the end connections 17 and 17' and the high resistance secondaries 20 and 20' in inductive relation thereto. This results, as already indicated, in high torque and relatively small currents at low speeds of the motor.

Here, as in the case previously described, it is important that the structure be such that the reluctance of the magnetic circuits linking with the end connecting rings 21 and 22 and 21' and 22' of the secondary electrical circuits be as high as possible, and in order to secure this condition these end connecting rings should have a large radial depth, while the magnetic cores 19 and 19' should have the smallest practicable radial depth consistent with adequate cross section to carry the required magnetic flux.

If desired, the rings 21 and 22 can be replaced by a single ring connected to both the low resistance squirrel cage 16 and the high resistance squirrel cage 20, and a similar substitution can be made for the corresponding rings 21' and 22'. This will give greater economy of space and material and permit the currents in each squirrel cage to make a complete circuit without linking with more than one magnetic circuit, which is very important for reasons stated above.

In some cases it would be desirable to simplify the construction by omitting the magnetic cores 18 and 18' over the primary end connection, and also the magnetic cores 19 and 19' on the secondaries, thus making the two high reluctance magnetic circuits entirely of air space throughout.

It has been stated above that the high resistance secondary windings 20 and 20' may be squirrel cage windings, and this would be desirable in many cases especially if a toothed structure is used for the magnetic cores 19 and 19'. When, however, these cores are given a smooth surface, or when they are omitted altogether, the high resistance secondary circuits may each be made of a solid piece of metal in the form of a drum mounted on each end of the low resistance squirrel cage 16. One form of this structure is shown at 23 in Fig. 3 the cores 19 and 19' being omitted. This construction has the merit of great simplicity and cheapness.

I have found that instead of making the magnetic cores 19 of ordinary magnetic material such as is generally used in alternating current apparatus, if these portions be made of a material exhibiting a high hysteresis effect, the starting torque of the motor can be still further increased due to the well known tendency for magnetic material to rotate with a rotating magnetic field. This tendency to rotate with the field is proportional at any given speed to the power loss in the material. I have also obtained a very simple, cheap and effective structure by using solid steel rings exhibiting this high hysteresis effect for the portions of the magnetic circuit mounted on the secondary member as shown at 24, Fig. 4. These solid steel rings or drums serve not only as the carriers of flux and thereby develop large hysteresis loss with corresponding torque, but they also serve to a degree as high resistance secondary electrical circuits owing to the eddy currents induced in them by the alternating flux. Since the resistivity of magnetic materials which exhibit a high hysteresis effect is usually very high, it will generally be desirable to place on the convex surfaces of the rings 24 and 24', bands 25 and 25' of better conducting material such as copper, aluminum or brass. I prefer to make these bands in the form of closed rings which form an integral part of the short circuiting rings of the low resistance squirrel cage 16, as shown in Fig. 4. The magnetic ring 24 should preferably be beveled on the edge adjoining the main rotor core, as shown in the figure. This reduces the reactance of the squirrel cage. The magnetic rings 24 and 24' may be made of any one of a large number of magnetically hard alloys. Alloys containing tungsten, chromium or manganese, or combinations of these metals, with iron as the chief constituent are well adapted for use in this connection. I prefer to have the bands 25 slotted as shown at 26 in Fig. 5 to give substantially the same effect as a squirrel cage construction.

It is preferable in carrying out my invention, to make the end connections of the primary winding substantially cylindrical in form instead of conical, as is most frequently done in the usual types of motors. In this way the mutual inductance between the primary end connections and the secondary electrical circuits is increased and the performance of the motor correspondingly improved. The cylindrical type of construction here contemplated is clearly shown in Figs. 1 to 4 inclusive.

I have described a structure comprising a single primary electrical circuit linking with a single magnetic circuit of low resistance and with a plurality of magnetic circuits of relatively high reluctance. It will be evident that there may also be used, if desired, a plurality of primary electrical circuits and magnetic circuits of low reluctance, in combination with a plurality of secondary electrical and magnetic circuits, and in the annexed claims I wish to claim broadly all such combinations.

I claim:

1. In an induction motor, the combination of a primary winding, a secondary element providing a plurality of secondary electrical circuits in inductive relation with said primary winding, but substantially not inductively related to each other, and means providing paths of low and substantially unvarying magnetic reluctance for the flux linking said primary winding with certain of said secondary circuits, and separate paths of high and substantially unvarying reluctance for the fluxes linking said primary winding with the others of said secondary circuits.

2. In an induction motor, the combination of a primary winding, a secondary element providing a plurality of secondary electrical circuits in inductive relation with said primary winding, but substantially not inductively related to each other, and means providing a path of low and substantially unvarying magnetic reluctance for the flux linking said primary winding with one only of said secondary circuits, and separate paths of high and substantially unvarying reluctance for the fluxes linking said primary winding with the others of said secondary circuits.

3. In an induction motor, the combination of a primary winding, a secondary element providing a plurality of secondary electrical circuits in inductive relation with said primary winding, but substantially not inductively related to each other, and means providing paths of low and substantially unvarying magnetic reluctance for the flux linking said primary winding with certain of said secondary circuits, and separate paths of high and substantially unvarying reluctance for the fluxes linking said primary winding with the others of said secondary circuits, the said secondary circuits which are linked with the paths of low reluctance having relatively low electrical resistance, and the said secondary circuits linked with the paths of high reluctance having high resistance.

4. In an induction motor, the combination of a primary winding, a secondary element providing a plurality of secondary electrical circuits in inductive relation with said primary winding, but substantially not inductively related to each other, and means providing a path of low and substantially unvarying magnetic reluctance for the flux linking said primary winding with one only of said secondary circuits, and separate paths of high and substantially unvarying reluctance for the fluxes linking said primary winding with the others of said secondary circuits, the said secondary circuit which is linked with the path of low reluctance, having a relatively low electrical resistance, and the said secondary circuits linked with paths of high magnetic reluctance, having relatively high resistance.

5. In an induction motor, the combination of a primary winding with end connections, and a secondary element providing three secondary electrical circuits, one of said secondary electrical circuits being in inductive relation with the said primary winding through a magnetic circuit of low reluctance, and the other secondary electrical circuits being in inductive relation with the end connections only of the said primary winding through magnetic circuits of relatively high reluctance.

6. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance.

7. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of magnetic material mounted on the rotor within one of the said high resistance secondary electrical circuits.

8. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of magnetic material mounted on the rotor within one of the said high resistance secondary electrical circuits, and comprising further a ring of magnetic material adapted to exclude eddy currents surrounding the outer surface of one set of end connections of the said primary winding.

9. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of a ring of magnetic material exhibiting a high hysteresis effect mounted on the rotor within one of the said high resistance secondary electrical circuits, and comprising further a ring of laminated magnetic material exhibiting a low hysteresis effect surrounding the outer surface of one set of end connections of the said primary winding.

10. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, said secondary electrical circuits of high resistance comprising metallic cylinders mounted on the rotor at either end of the said low resistance secondary electrical circuit and within the end connections of the said primary electrical circuit.

11. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connection only of the said primary winding through magnetic circuits of relatively high reluctance, said secondary electrical circuits of high resistance comprising metallic cylinders mounted on the rotor at either end of the said low resistance secondary electrical circuit and within the end connections of the said primary electrical circuit, certain of said metallic cylinders being composed of a magnetic material adapted to permit eddy currents.

12. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, said secondary electrical circuits of high resistance comprising metallic cylinders mounted on the rotor at either end of the said low resistance secondary electrical circuit and within the end connections of the said primary electrical circuit, certain of said metallic cylinders being composed of a magnetic material exhibiting a high hysteresis effect.

13. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, said secondary electrical circuits of high resistance comprising metallic cylinders mounted on the rotor at either end of the said low resistance secondary electrical circuit and within the end connections of the said primary electrical circuit, the said metallic cylinders comprising rings of magnetic material exhibiting a high hysteresis effect, and rings of non-magnetic material surrounding the said magnetic rings and in inductive relation with the end connections of the said primary winding.

14. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, the end connections of the said low resistance secondary electrical circuit consisting of rings of good conducting material adapted to have low reactance.

15. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of a ring of magnetic material mounted on the rotor within one of the said high resistance secondary electrical circuits, and having a small radial depth relative to the end connections of the secondary electrical circuit of low resistance.

16. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of a ring of magnetic material mounted on the rotor within one of the said high resistance secondary electrical circuits, the said high resistance secondary electrical circuits each comprising a portion of the short circuiting ring of the said secondary electrical circuit of low resistance.

17. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of a ring of magnetic material mounted on the rotor within one of the said high resistance secondary electrical circuits, the said high resistance secondary electrical circuits each comprising a portion of the short circuiting ring of the said secondary electrical circuit of low resistance, the said portion of said short circuiting ring being provided with slots designed to make it electrically equivalent to what is known as a squirrel cage construction.

18. In an induction motor, the combination of a primary winding with end connections, and a secondary element providing three secondary electrical circuits, one of said secondary electrical circuits having a relatively low resistance and being in inductive relation with the said primary winding through a magnetic circuit of low reluctance, and the other secondary electrical circuits having relatively high resistance and being in inductive relation with the said end connections only of the said primary winding through magnetic circuits of relatively high reluctance, each of said magnetic circuits of high reluctance consisting in part of magnetic material mounted on the rotor within one of the said high resistance secondary electrical circuits, the said magnetic material being in the form of a ring with a beveled edge on the side adjoining the main rotor core adapted to make the radial depth of the said magnetic ring greater near its outer end than near its inner end.

19. In an induction motor, the combination of a primary winding with end connections, and a secondary element providing three secondary electrical circuits, one of said secondary electrical circuits being in inductive relation with the said primary winding through a magnetic circuit of low reluctance, and the other secondary electrical circuits being in inductive relation with the end connections only of the said primary winding through magnetic circuits of relatively high reluctance; the said end connections of the primary electrical circuit having collectively, substantially a cylindrical form.

BURTON McCOLLUM.